US008751518B1

(12) United States Patent
Ahmad et al.

(10) Patent No.: US 8,751,518 B1
(45) Date of Patent: *Jun. 10, 2014

(54) FIXED PHRASE DETECTION FOR SEARCH (75) Inventors: Waseem Ahmad, Mountain View, CA (US); Deepak Jain, Fremont, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,884

(22) Filed: May 7, 2012

Related U.S. Application Data (63) Continuation of application No. 12/712,081, filed on Feb. 24, 2010, now Pat. No. 8,176,067.

(51) Int. Cl.
G06F 17/30 (2006.01)

(52) U.S. Cl.
USPC .......................................................... 707/765

(58) Field of Classification Search
CPC ........................... G06F 17/30; G06F 17/30663
USPC ........................... 707/737, 765, 767, E17.084
See application file for complete search history.

(56) References Cited

U.S. PATENT DOCUMENTS

| 6,947,930 | B2 | 9/2005 | Anick et al. | |
|---|---|---|---|---|
| 8,180,760 | B1 * | 5/2012 | Carver et al. | 707/708 |
| 2004/0167775 | A1 * | 8/2004 | Sorin | 704/208 |
| 2006/0129534 | A1 | 6/2006 | Jones et al. | |
| 2006/0228011 | A1 * | 10/2006 | Everett et al. | 382/128 |
| 2008/0140643 | A1 * | 6/2008 | Ismalon | 707/5 |
| 2010/0153365 | A1 * | 6/2010 | Shemtov et al. | 707/722 |
| 2010/0179855 | A1 * | 7/2010 | Chen et al. | 705/10 |
| 2011/0035379 | A1 * | 2/2011 | Chen et al. | 707/740 |
| 2011/0072023 | A1 * | 3/2011 | Lu | 707/741 |

OTHER PUBLICATIONS

Mishne, Gilad, and Maarten De Rijke. "Boosting web retrieval through query operations." Advances in Information Retrieval. Springer Berlin Heidelberg, 2005. 502-516.*
Borgman, Christine L. "Why are online catalogs still hard to use?." JASIS 47.7 (1996): 493-503.*
Gudivada, Venkat N., et al. "Information retrieval on the world wide web." Internet Computing, IEEE 1.5 (1997): 58-68.*
Agichtein, et al. 2001. "Learning Search Engine Specific Query Transformations for Question Answering." In Tenth International World Wide Conference (WWW-10), Hong Kong, pp. 169-178.
Velez, et al. 1997. "Fast and Effective Query Refinement." In Proceedings of the 20$^{th}$ Annual International ACM SIGIR Conference on Research and Development in Information Retrieval pp. 6-15.
Xu, et al. 1996. "Query Expansion *Using Local and Global Document Analysis." SIGIR pp. 4-11.

* cited by examiner

*Primary Examiner* — Usmaan Saeed
*Assistant Examiner* — Nan Hutton
(74) *Attorney, Agent, or Firm* — Novak Druce Connolly Bove + Quigg LLP (57) ABSTRACT A set of search requests may be analyzed to detect fixed phrases suitable for inclusion in a search index. Sets of candidate phrases may be identified among the search requests. Fixed phrases may be detected among the candidate phrases using statistical techniques, for example, by identifying phrases having a relatively high pointwise mutual information (PMI) with respect to component keywords. Fixed phrase detection may include keyword and/or phrase clustering. Clusters may correspond to topics defined using a latent Dirichlet allocation (LDA) procedure. Fixed phrase detection may include identifying phrases having relatively high PMI within particular clusters.

19 Claims, 6 Drawing Sheets

FIXED PHRASE DETECTION FOR SEARCH

CROSS REFERENCE TO RELATED APPLICATION

This application is a continuation of, and claims priority to, allowed U.S. patent application Ser. No. 12/712,081, filed Feb. 24, 2010, entitled "Fixed Phrase Detection for Search," which is hereby incorporated herein by reference for all purposes.

BACKGROUND

It has become commonplace for people to use computer systems to search large collections of electronically indexed content. Typically, as part of a search, a person (or, more generally, a "searcher") interacts with a computer system user interface (e.g., a graphical user interface or an application programming interface) to submit one or more search requests and view corresponding sets of search results ("search result sets"). The following description will be concerned with search requests that, at least in part, use strings of text (e.g., strings of Unicode characters) to indicate searcher interest in portions of a collection of content. Such strings of text are typically interpreted by a search engine as one or more search terms. For example, search terms may include words of a language such as English and logical operators such as 'and' and 'or'.

The collection of content searched by a search engine is typically large, and a typical goal of the search engine is to present to the searcher the most relevant content with respect to a particular search request. However, there are many tradeoffs that may take place as a part of determining relevance of content, for example, with respect to a set of search terms, and conventional search engines incorporating such tradeoffs may be sub-optimal in one or more of a variety of contexts. Such sub-optimality with respect to relevance isn't insignificant. At least, it may be detrimental to searching efficiency. In commercial contexts, for example, sub-optimal surfacing of relevant content may result in significant commercial penalties such as lost sales.

One such tradeoff typically involves deciding how to index the collection of content and/or parse search terms from search requests. For example, a collection index may include information corresponding to a matrix associating search terms (e.g., each row may correspond to a particular search term) with content in the collection (e.g., each column may correspond to a particular item of content in the collection), with each position in the matrix including a relevance score quantifying a relevance of the search term for the item of content. A smaller collection index may reduce computing resource requirements, on the other hand, additional search terms (and thus a larger index) may enhance a relevance of search results to the searcher. Determining which search terms to include in the collection index and/or parse from search requests may be further complicated by the fact that a phrase (i.e., multiple words in a particular order) may indicate an interest different to interests indicated by its component words. For example, a search request using "Newton Baker" may indicate a subject matter interest different to search requests using "Newton" or "Baker" alone.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, a set of search requests (e.g., a set of historical search requests) may be analyzed to detect fixed phrases suitable for inclusion in a search index (e.g., an index of a collection of content) and/or for parsing from further search requests. For the purposes of this description, it will be helpful to distinguish between a single word utilized to index content in the search index (hereinafter "keyword") and a plurality of words in a particular order utilized to index content in the search index distinct from keywords (hereinafter "fixed phrase"). For example, "Newton" and "Baker" may be keywords in the search index, and "Newton Baker" a fixed phrase, while "Baker Newton" would be considered a distinct fixed phrase if added to the search index. In the example of the matrix associating search terms with content in the collection, each keyword and each fixed phrase may correspond to a distinct row of relevance scores with respect to items of content in the collection. Keywords and fixed phrases included in the search index (indexed keywords and indexed fixed phrases) may be targeted in particular for parsing from search requests. Furthermore, relevance scores may have a searcher feedback component. For example, searcher interaction with items of content (e.g., accessing the items) responsive to search requests including particular fixed phrases may increase associated relevance scores.

A set of candidate phrases may be identified in the set of search requests, and grouped by phrase length (i.e., number of words). For example, the raw search query strings may be processed to remove stop words, logical operators, and so on. Statistically significant phrases may be detected among the candidates of each group, and added to the search index as fixed phrases. For example, a candidate phrase having a pointwise mutual information with respect to its component words that is greater than a threshold may be detected as statistically significant relative to the candidates of a particular group. The threshold may be determined for each set of candidate phrases and/or each group. For example, the threshold may be based on a greatest pointwise mutual information for the set and an exponential model.

In at least one embodiment, fixed phrase detection may be further enhanced by first clustering keywords with respect to the collection of content. For example, a latent Dirichlet allocation (LDA) may be utilized to cluster the keywords into a specified number of topics (defined by the keywords that they cluster). Such topics may be referred to herein as automatically allocated topics, unsupervised topics and/or LDA topics to distinguish them from categories and/or groups into which keywords are manually placed and/or allocated. Sets of candidate phrases (candidate phrase clusters) may then be identified with respect to the clusters. For example, a particular candidate phrase may be considered in a particular cluster if each of its component keywords is in the cluster. Statistically significant phrases may be then be detected with respect to the candidate phrase clusters, and added to the search index as fixed phrases. In at least one embodiment, such detection of fixed phrases with respect to clusters may significantly enhance a user search experience, for example, by returning more relevant results.

Figure 1:
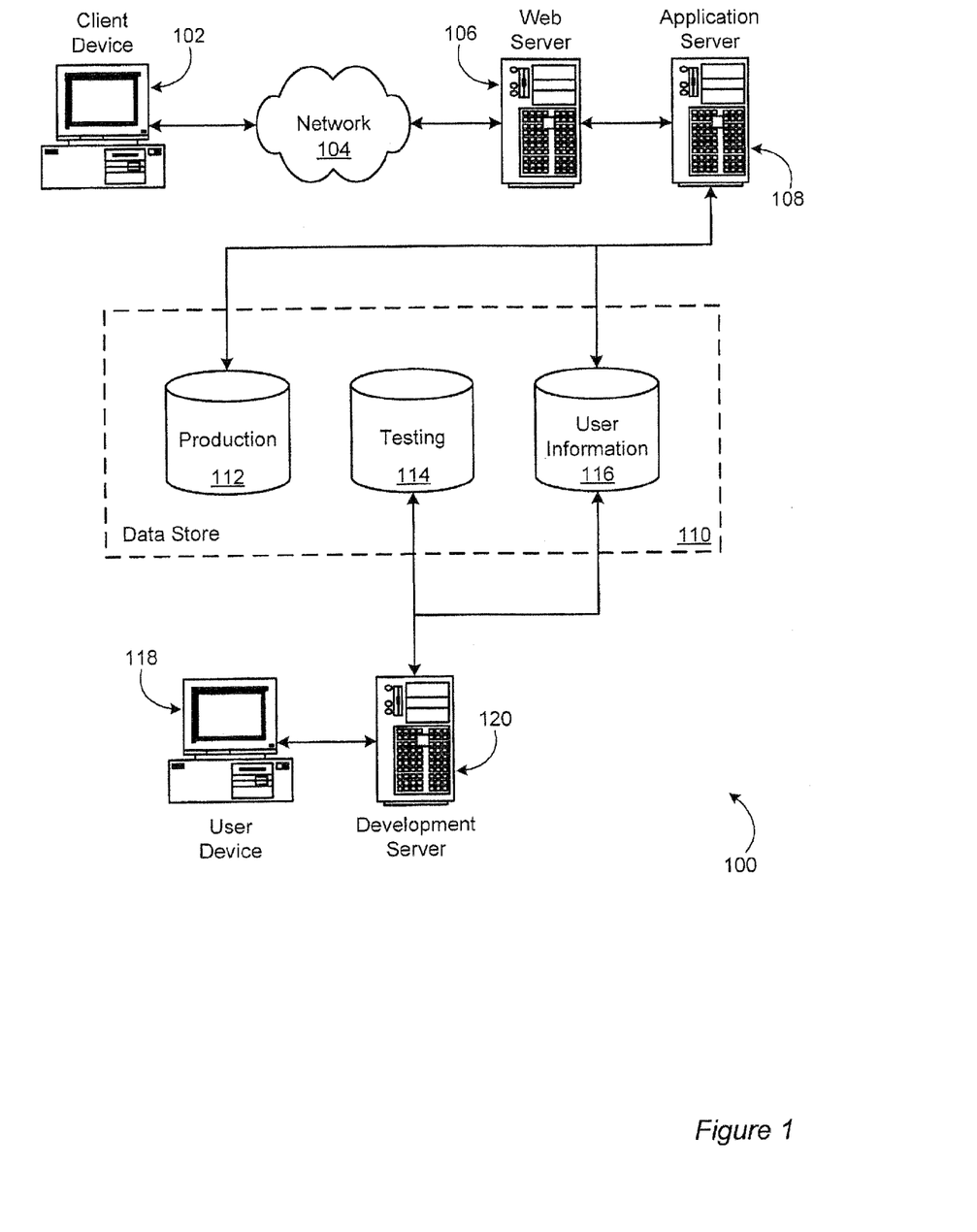
FIG. 1 is a schematic diagram illustrating an example environment for implementing aspects in accordance with at least one embodiment.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
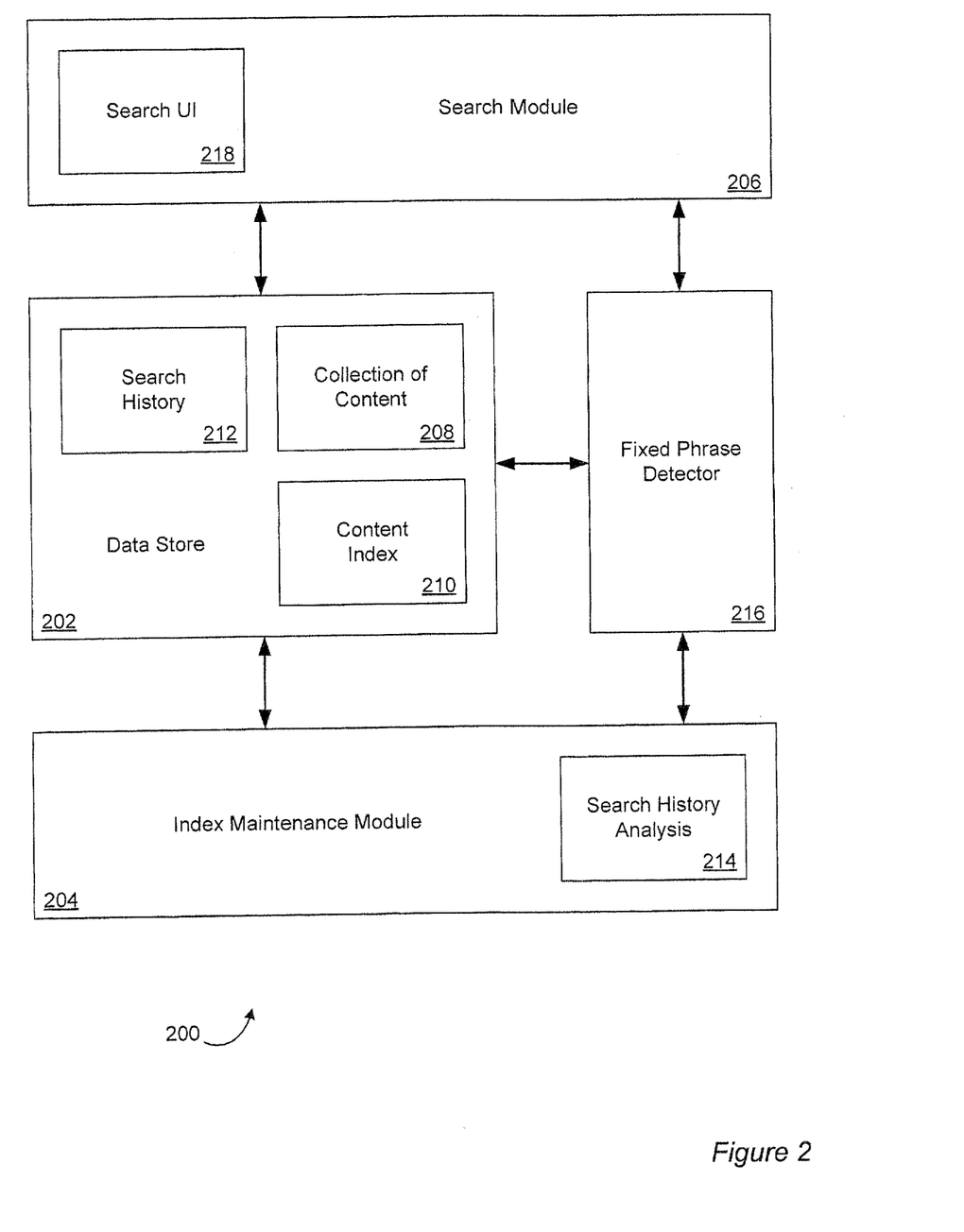
FIG. 2 is a schematic diagram depicting aspects of an example computerized system in accordance with at least one embodiment.

It will be helpful to have reference to an example system in accordance with at least one embodiment. FIG. 2 depicts aspects of an example computerized system 200 in accordance with at least one embodiment. The system 200 may include a data store 202, an index maintenance module 204, a fixed phrase detector 216 and a search module 206. The data store 202 may include a collection of content 208, a content index 210 utilized by the search module 206 to search the collection of content 208 and a search history 212. The index maintenance module 204 may include a search history analysis module 214 that utilizes and/or is utilized by the fixed phrase detector 216 to analyze the search history 212 and facilitate maintenance of the content index 210. The search module 206 may include a search user interface (UI) module 218 capable of facilitating user interaction with the system 200. The search module 206 may utilize the fixed phrase detector 216 to detect fixed phrases, for example, in search requests. The arrows between the modules 202, 204, 206, 216 in FIG. 2 indicate that the modules 202, 204, 206, 216 are communicatively coupled, for example, by a communication network with a computer and/or between a plurality of computers such as the servers 106, 108, 120 of FIG. 1. For example, the search module 206 may be hosted and/or implemented at least in part by the application server 108, the data store may incorporate and/or be incorporated at least in part by the data store 110, the index maintenance module 204 may be hosted and/or implemented at least in part by the development server 120, and the fixed phrase detector 216 may be hosted and/or implemented at least in part by the application server 108 and/or the development server 120.

The collection of content 208 may include any suitable items of content. Examples of suitable items of content include electronic records, data structures, data objects, representations including representations of goods such as physical goods and commercial goods and representations of services such as commercial services, documents, document collections, and suitable combinations thereof. The content index 210 may index the collection of content 208. For example, the content index 210 may include one or more data structures collectively corresponding to a relevance matrix associating keywords and fixed phrases (e.g., each row may correspond to a particular keyword or fixed phrase) with content in the collection 208 (e.g., each column may correspond to a particular item of content in the collection 208), with each position in the matrix including a relevance score quantifying a relevance of the key word or fixed phrase for the item of content. As will be apparent to one of skill in the art, a variety of conventional data structures may be utilized in this role, and further details of such data structures need not be described herein. The relevance matrix may be implemented and/or represented by any suitable such data structure, and references to the reference matrix below are to be understood as also referencing the data structure(s).

The search UI module 218 may provide information from the search module 206 for presentation. For example, the search UI module 218 may generate a search user interface (UI) presentation specification and provide the specification to the client device 102 (FIG. 1) through the network 104. The search UI module 218 may specify the search UI presentation with any suitable presentation specification language including suitable hypertext markup languages (e.g., HTML) and suitable programming and/or scripting languages (e.g., JavaScript). The search UI module 218 may receive information responsive to the search UI presentation. For example, the search UI module 218 may receive search requests including one or more search terms from the client device 102. The search UI module 218 may process received requests and activate associated search module 206 functionality in response.

A search request may include a string of text (a "search string"), for example, a string of characters in accordance with a Unicode standard such as "The Unicode Standard, Version 5.0 (5th Edition)," authored by The Unicode Consortium, and published by Addison-Wesley Professional on Nov. 19, 2006. The search module 206 may identify one or more keywords and/or fixed phrases in the string of the search request. The search module 206 may identify fixed phrases in the string of the search request based at least in part on inclusion of the fixed phrases in the content index 210 and/or utilizing a parsing interface (e.g., a programmatic interface) of the fixed phrase detector 216. The search module 206 may then utilize the content index 210 to identify items of content in the collection 208 having a relatively high relevance score with respect to the identified keywords and/or fixed phrases. For example, the search module 206 may perform any suitable matrix operation and/or equivalent operation to lookup relevance scores for content in the collection 208 indexed by keywords and/or fixed phrases. The search module 206 may determine a search result set for the identified keywords and/or fixed phrases. For example, the search result set may include a set of items of content in the collection 208 having a relevance score above a relevance score threshold and/or ranked according to relevance score. The search result set, or a reference thereto, may be provided to the search UI module 218, which may format the search result set for presentation to the user and/or searcher.

Details of each search request handled by the search module 206 may be recorded in the search history 212. In particular, the search module 206 may record the search string, search terms, keywords and/or fixed phrases included in search requests along with any suitable metadata including, for example, a timestamp corresponding to a time and/or a date that the search request was received by the search module 206. In at least one embodiment, duplicate search requests are not removed, and/or at least, duplicates are counted and/or otherwise suitably summarized.

The index maintenance module 204 may establish and/or maintain the content index 210. For example, the index maintenance module 204 may utilize the search history analysis module 214 to analyze the search history 212 to identify keywords and fixed phrases suitable for inclusion in the content index 210. The index maintenance module 204 may determine relevance scores for each identified keyword and/or fixed phrase with respect to content in the collection 208. The search history analysis module 214 may perform any suitable analysis on the search history 212. Examples of suitable analysis operations include counting, summarizing, determining distributions such as statistical distributions of keywords and/or fixed phrases and probability distributions of keywords and/or fixed phrases, and suitable combinations thereof. As described below in more detail, the fixed phrase detector 216 may detect fixed phrases in the search history 212 that are suitable for inclusion in the content index 210.

Figure 3:
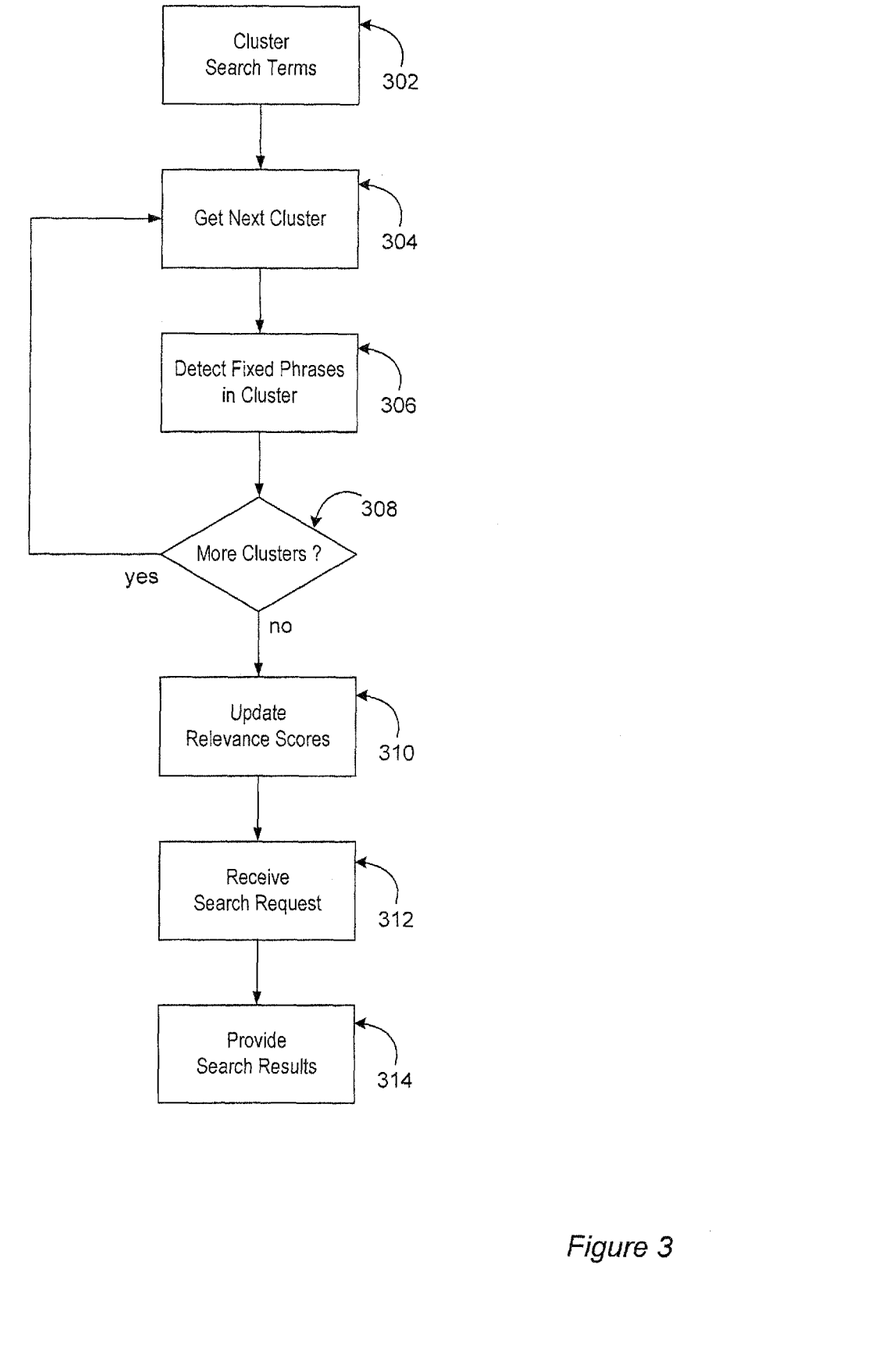
FIG. 3 is a flowchart depicting example steps for facilitating a search in accordance with at least one embodiment.

The description now turns to example steps that may be performed in accordance with at least one embodiment. FIG. 3 depicts example steps for facilitating a search in accordance with at least one embodiment. At step 302, search terms may be clustered. For example, the fixed phrase detector 216 of FIG. 2 may cluster search terms in the search history 212 with respect to the collection of content 208. Any suitable search term clustering technique may be utilized at step 302. The search terms may be clustered automatically, algorithmically and/or independent of human supervision (i.e., utilizing an unsupervised clustering technique). For example, the search terms may be allocated to topics in accordance with an LDA procedure and/or as described below in more detail with reference to FIG. 4. Alternatively, search terms in the search history 212 may be clustered into a single cluster with respect to the collection of content. As a further alternative, or in addition, the collection of content 208 may be categorized in accordance with a content category hierarchy, and the search terms may be clustered with respect to categories categorizing content of the collection 208 having relatively high relevance with respect to the search terms (e.g., having a relevance score above a threshold).

At step 304, a next (e.g., a first) cluster of search terms may be selected for processing. At step 306, one or more fixed phrases may be detected in the selected cluster. For example, the fixed phrase detector 216 (FIG. 2) may identify statistically significant phrases among phrases having their component search terms in the selected cluster. Any suitable statistical test may be utilized to identify such statistically significant phrases. For example, a phrase having a pointwise mutual information (with respect to its component words) above a threshold may be identified as statistically significant. An example of fixed phrase detection in accordance with at least one embodiment is described in more detail below with reference to FIG. 5. At step 308, it may be determined whether each of the clusters identified at step 302 have been processed, for example, at step 306. If there are more clusters to process, a procedure incorporating step 308 may progress to step 304. Otherwise, the procedure may progress to step 310.

At step 310, one or more relevance scores may be updated. For example, the index maintenance module 204 (FIG. 2) may determine a relevance score for each item of content in the collection 208 with respect to each fixed phrase detected at step 306, and update the content index 210, for example, by adding new rows to the relevance matrix corresponding to each detected fixed phrase. At step 312, a search request may be received. For example, the search module 206 may receive the search request from the client device 102 of FIG. 1. At step 314, search results may be provided. For example, the search module 206 may provide search results responsive to the search request as described above with reference to FIG. 2.

Figure 4:
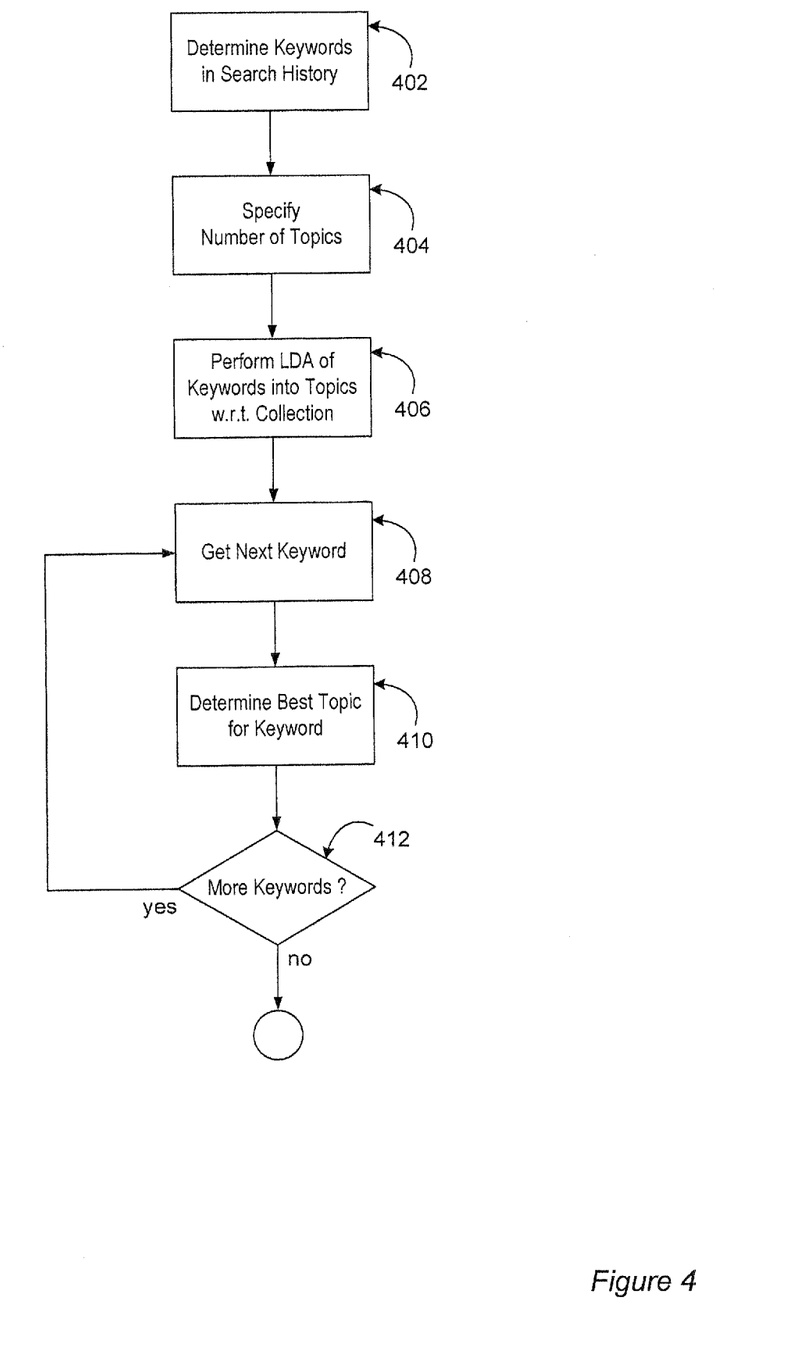
FIG. 4 is a flowchart depicting example steps for associating keywords with topics in accordance with at least one embodiment.

When associating search terms to clusters, at step 302, a particular search term may be associated with more than one cluster. For example, an associative measure between the search term and each topic may be determined with an LDA procedure. However, in at least one embodiment, each search term is allocated to no more than one cluster. It will be helpful to have reference to an example in which each keyword is allocated to no more than one topic. FIG. 4 depicts example steps for associating keywords with topics in accordance with at least one embodiment.

At step 402, a set of keywords may be determined. For example, the search history analysis module 214 (FIG. 2) may identify search terms and/or keywords in the search history 212. As a part of step 402, the search history analysis module 214 may extract the identified search terms and/or keywords from the search history 212 for further analysis. At step 404, a number of topics may be specified. For example, the fixed phrase detector 216 may be configured to specify the number of topics (e.g., on the order of hundreds or thousands) for the LDA procedure. At step 406, an allocation of keywords into topics with respect to the collection of content 208 may be performed in accordance with the LDA procedure. For example, the fixed phrase detector 216 may determine an associative measure between each keyword in the set determined at step 402 and each of the number of topics specified at step 404 in accordance with the LDA procedure. The LDA procedure may allocate keywords to topics with respect to one or more query strings in the search history 212 and/or with respect to one or more items of content, such as documents and content metadata including text strings, in the collection 208. Any suitable LDA procedure, or portion thereof, may be incorporated into step 406. Examples of suitable LDA procedures include procedures described in Blei et al, "Latent Dirichlet Allocation," Journal of Machine Learning Research, March 2003.

At step 408, a next (e.g., a first) keyword of the set determined at step 402 may be selected. At step 410, a best topic for the keyword may be determined. For example, the search history analysis module 214 (FIG. 2) may select one of the topics having a highest associative measure with respect to the keyword as the best topic. The best topic determination may be with respect to the LDA procedure performed at step 406, for example, with respect to the one or more query strings and/or items of content. At step 412, it may be determined whether there are more keywords in the set for which to determine a best topic. If there are more keywords in the set, a procedure incorporating step 412 may progress to step 408. Otherwise, the procedure may progress to a step not shown in FIG. 4, for example, step 304 of FIG. 3.

Figure 5:
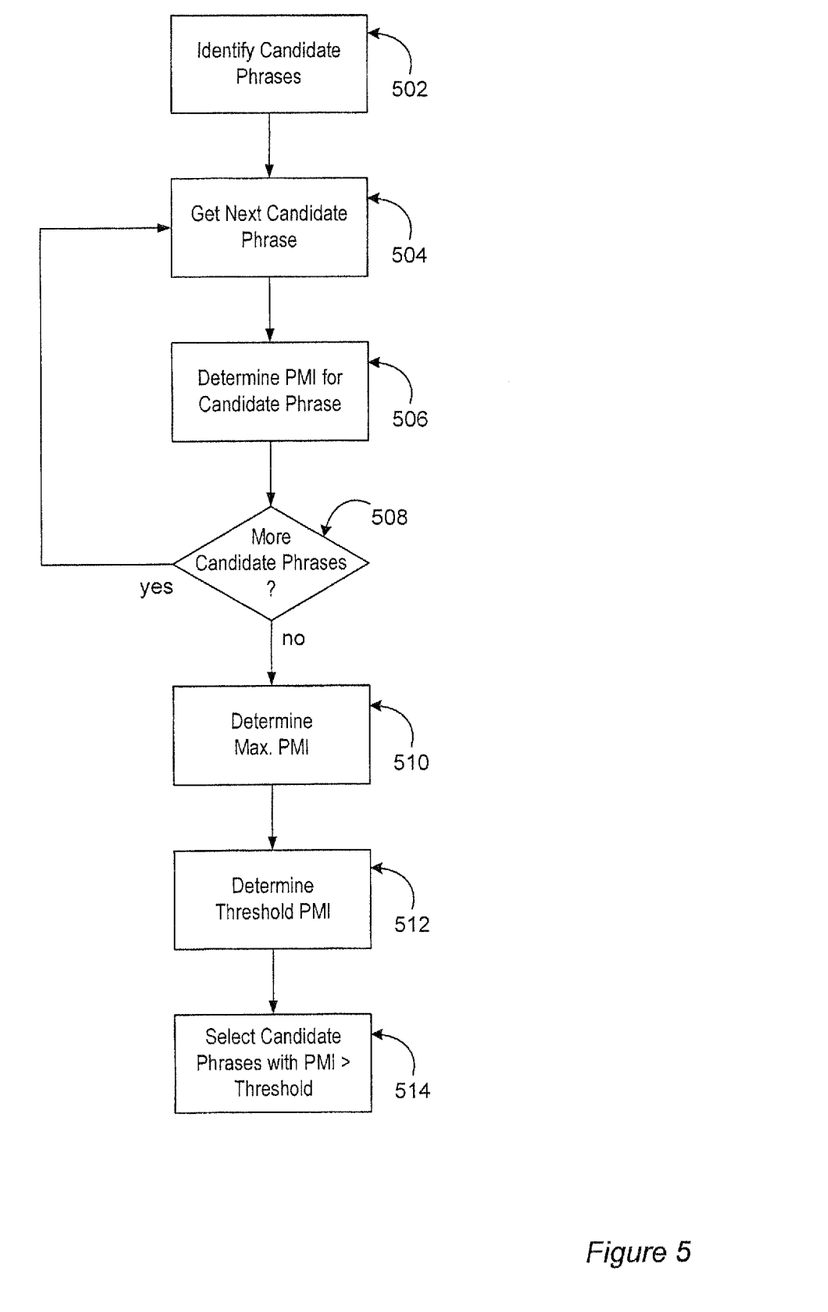
FIG. 5 is a flowchart depicting example steps for detecting fixed phrases in accordance with at least one embodiment.

Associating keywords to topics may be considered as clustering the keywords by topic. A particular phrase may be considered in a particular cluster if each of the component keywords of the phrase is in the cluster. Alternatively, the phrase may be considered in the cluster if at least one of its component keywords is in the cluster. In at least one embodiment, fixed phrases are detected with respect to keyword clusters. However, in at least one embodiment, there is a single keyword cluster for each collection of content such as the collection of content 208 of FIG. 2. FIG. 5 depicts example steps for detecting fixed phrases in accordance with at least one embodiment.

At step 502, a set of candidate phrases may be identified. For example, the fixed phrase detector 216 (FIG. 2) may identify each phrase in a particular cluster as part of the set of candidate phrases. In at least one embodiment, the set of candidate phrases may be selected so that it contains phrases having a particular length and/or a length less than a threshold phrase length. At step 504, a next (e.g., a first) candidate phrase may be selected. At step 506, a measure of pointwise mutual information (PMI) may be determined for the selected candidate phrase. For example, the fixed phrase detector 216 may determine a normalized pointwise mutual information score for the selected candidate phrase with respect to its component keywords among candidate phrases of a same length. A more detailed example will be helpful.

Suppose the selected candidate phrase is "Newton Baker", and that each of "Newton" and "Baker" is an identified keyword belonging to a first topic T1. It will be helpful to denote these keywords as "Newton(T1)" and "Baker(T1)" to distinguish them from same keywords identified as belonging to different topics. For example, the keyword "Newton" in the search phrase "Isaac Newton" might be identified as belonging to a second topic T2 and be denoted "Newton(T2)". The fixed phrase detector 216 (FIG. 2) may determine a first count n(x, y) for a number of occurrences of the phrase "Newton Baker" in the search history 212. The fixed phrase detector 216 may further determine a second count n(x) for the number of phrases like "Newton(T1) K" in the search history 212 where K is any identified keyword. Still further, the fixed phrase detector 216 may determine a third count n(y) for the number of phrases like "K Baker(T1)" in the search history 212 where, again, K is any identified keyword. The fixed phrase detector 216 may then determine the normalized pointwise mutual information score based at least in part on the first count n(x, y), the second count n(x) and the third count n(y). For example, the normalized pointwise mutual information score may be based at least in part on a ratio of the first count n(x, y) to a product of the second count n(x) and the third count n(y) and/or any suitable conventional measure of pointwise mutual information.

In at least one embodiment, the normalized pointwise mutual information score may alternately be based at least in part on weighted versions m(x, y), m(x) and m(y) of the first count n(x, y), the second count n(x) and the third count n(y), respectively. For example, the weighted versions m(x, y), m(x), m(y) of the counts n(x, y), n(x), n(y) may be determined as a product of the counts n(x, y), n(x), n(y) and weights k(x, y), k(x), k(y), respectively. The weights k(x, y), k(x), k(y) may be any suitable weights and/or in accordance with any suitable weighting scheme. For example, each contributor to the counts n(x, y), n(x), n(y) may be associated with an age (e.g., a difference in time between a time of occurrence of the contributor and a current time), and the weights k(x, y), k(x), k(y) may be based at least in part on an age profile of contributors to the respective counts n(x, y), n(x), n(y). In at least one embodiment, the weight of each contributor to the counts n(x, y), n(x), n(y) decays exponentially with respect to age. For example, contributors having an age less than an age threshold may contribute a full count, whereas older contributors may contribute a decayed count having a value diminished from the full count according to a relevance half-life. To continue the example, if the relevance half-life was set to be 1 month, a contributing event such as a search request with an age of 1 month would be weighted so as to contribute a half count to the appropriate one or more of the weighted versions m(x, y), (x), m(y) of the counts n(x, y), n(x), n(y).

At step 508, it may be determined if there are more candidate phrases for which to determine a pointwise mutual information measure. If there are more candidate phrases, a procedure incorporating step 508 may progress to step 504. Otherwise, the procedure may progress to step 510.

At step 510, a maximum pointwise mutual information score may be determined. For example, the fixed phrase detector 216 may identify a greatest one of the pointwise mutual information scores determined at step 506 for the candidate phrases of the cluster. At step 512, a pointwise mutual information threshold (or "fixed phrase threshold") may be determined. The fixed phrase detector 216 may determine the fixed phrase threshold based at least in part on the maximum pointwise mutual information score determined at step 510. For example, the fixed phrase detector 216 may determine the fixed phrase threshold based at least in part on a specified fraction of the maximum pointwise mutual information score. In at least one embodiment, the fixed phrase threshold may be further based at least in part on a model of exponential decay from the maximum pointwise mutual information score. For example, the pointwise mutual information scores of the set of candidate phrases identified at step 502, when sorted from greatest to least, may be assumed to conform to an exponential decay curve. The fixed phrase threshold $PMI_t$ may then be calculated according to a formula such as $$PMI_t = PMI_{max} \exp(-k\alpha)$$

where $PMI_{max}$ is the maximum pointwise mutual information score determined at step 510, exp( ) is the conventional exponential function, k is an empirically determined curve fitting constant, and $\alpha$ is a decay constant (e.g., in the range 2-3) chosen depending on a desired quantity of detected fixed phrases.

At step 514, one or more of the candidate phrases having a determined pointwise mutual information score greater than the fixed phrase threshold may be selected as fixed phrases. For example, the fixed phrase detector 216 (FIG. 2) may compare each of the set of candidate phrases identified at step 502 with the fixed phrase threshold determined at step 512. Alternatively, or in addition, the fixed phrase detector 216 may at least partially sort the set of candidate phrases based at least in part on the pointwise mutual information scores determined at step 506 before identifying a subset of the set of candidate phrases as fixed phrases based at least in part on the fixed phrase threshold.

Figure 6:
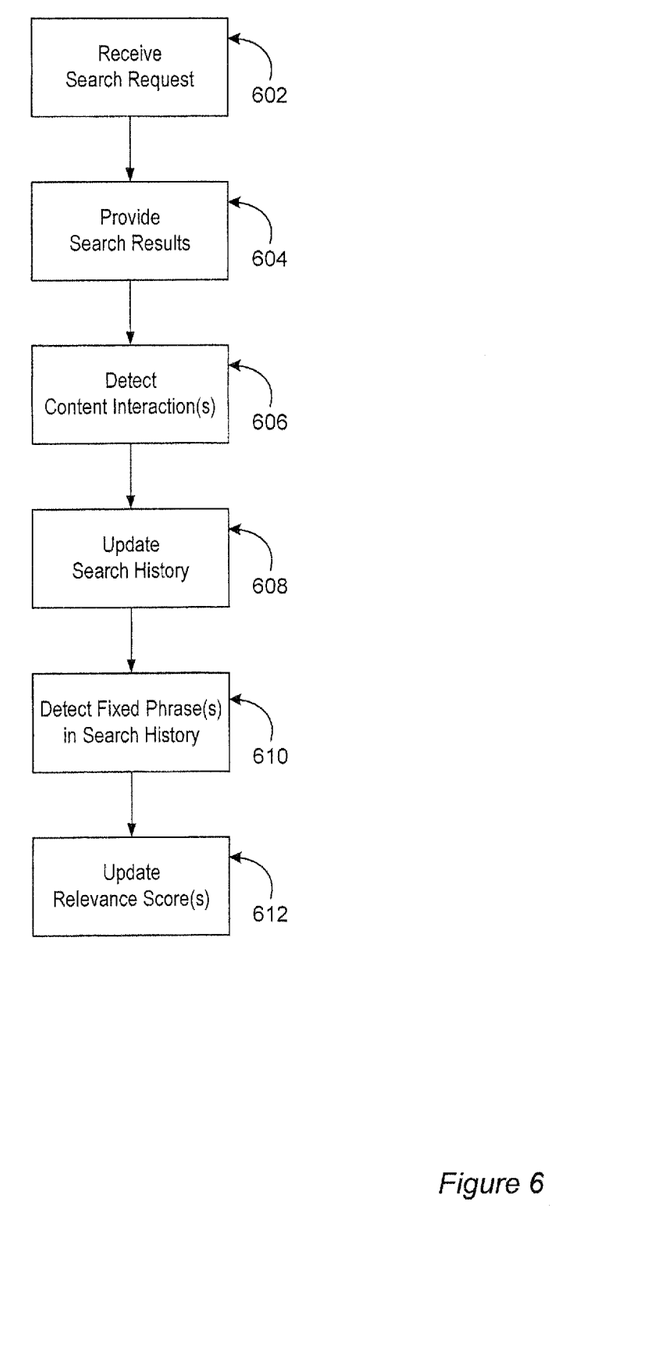
FIG. 6 is a flowchart depicting further example steps for facilitating searches in accordance with at least one embodiment.

Example steps for facilitating a search in accordance with at least one embodiment were described above with reference to FIG. 3. Some of the steps depicted in FIG. 3 may be relatively remote in time from others of the steps. For example, the clustering step 302, the detecting step 306 and the step 310 updating relevance scores may occur during a build mode of search engine operation (e.g., as part of building the content index 210 of FIG. 2), while the receiving step 312 and the providing step 314 may occur during a live mode of search engine operation (e.g., as part of servicing search requests by the search module 206). Build and live modes of search engine operation may occur concurrently, however the search module 206 may restrict itself to old and/or stable versions of the content index 210 while the content index 210 is being updated and/or undergoing a build process. The content index 210 may be updated regularly (e.g., periodically and/or as scheduled). Furthermore, a particular content index 210 update may take into account detected searcher behavior, such as content interactions, since a previous content index 210 update. FIG. 6 depicts example steps for further facilitating searches in accordance with at least one embodiment.

At step 602, a search request may be received, for example, at the search module 206 of FIG. 2. At step 604, search results based at least in part on the search request received at step 602 may be provided. For example, steps 602 and 604 may correspond to steps 312 and 314, respectively, of FIG. 3. At step 606, interaction with content at least referenced by the search results provided at step 604 may be detected. For example, the search results provided at step 604 may be provided to the client device 102 of FIG. 1. A user of the client device 102 may interact with one or more portions of the provided search results at least referencing content of the collection 208, and the client device 102 may notify the search module 206 of the interaction(s). Any suitable search result and/or content interactions may be detected. For example, interactions suitable for detection may include indications of interest in one or more portions of the provided search results with an input device of the client device 102 such as moving a display pointer over or near a search result portion and selecting a search result portion, as well as accessing and/or viewing content at least referenced by the provided search results.

At step 608, search history may be updated. For example, the search history 212 of FIG. 2 may be updated with the search request received at step 602, the search results provided at step 604, the content interaction(s) detected at step 606 and/or summaries, characterizations, combinations and sub-combinations thereof. At step 610, one or more fixed phrases may be detected. For example, the search history analysis module 214 may utilize the fixed phrase detector 216 as described above with reference to FIG. 4 and FIG. 5 to detect fixed phrases in the search history 212. Alternatively, or in addition, the search module 206 may detect fixed phrases in search requests, for example, utilizing the fixed phrase detector 216, and record them as fixed phrases in the search history 212, for example, utilizing suitable indicia.

At step 612, one or more relevance scores may be updated. For example, the index maintenance module 204 may update relevance score(s) of fixed phrases detected at step 610 for content for which interactions were detected at step 606. In at least one embodiment, detection of one or more of a set of types of interaction with content at least referenced by search results provided in response to a search request including a particular fixed phrase is an indication that the fixed phrase is relevant with respect to the content. Such an indication may result in a higher relevance score for the fixed phrase with respect to the content. Steps 610 and 612 may occur during a build mode of search engine operation. Alternatively, or in addition, step 612 may occurring during a live mode of search engine operation and/or responsive to detection of content interaction(s) at step 606. Relevance scores may be updated based at least in part on interaction statistics summarizing interactions by multiple searchers with respect to fixed phrases and/or items of content. For example, a "click count" may be determined for each fixed phrase and item of content pair corresponding to a count of occurrences of at least a reference to the item of content being selected from search results provided responsive to search requests including the fixed phrase.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system for facilitating a search, comprising:
    at least one processor; and
    memory including instructions that, when executed by the at least one processor, cause the computing system to:
        cluster search terms extracted from previous searches into a plurality of search term clusters independent of human supervision;
        for each of the plurality of search term clusters,
            identify a candidate search phrase comprising a first search term and a second search term;
            determine a first count of the first search term, a second count of the second search term, and a mutual count of the first search term and the second search term appearing simultaneously in the previous searches;
            weight each individual count of the first count, the second count, and the mutual count based at least in part on an age of a respective individual count with respect to the previous searches, wherein each age is a difference in time between a current time and when the respective individual count appeared in the previous searches;
            determine a pointwise mutual information score for the candidate search phrase using the weighted first count of the first search term, the weighted second count of the second search term, and the weighted mutual count of the first search term and the second search term;
            select the candidate search phrase as a fixed phrase for inclusion in a respective search term cluster based at least in part on the determined pointwise mutual score being greater than a threshold score;
        in response to receiving a search request, determine a relevance score for each of at least a portion of the search terms, including the fixed phrase, with respect to a collection of content;
        provide at least one search result for presentation, the at least one search result at least referencing content selected from the collection of content based at least in part on the at least one relevance score;
        detect interaction with a search result of the provided at least one result from a user; and
        update the clustered search terms associated with the search result.

2. The computing system of claim 1, wherein clustering search terms further comprises assigning each search term to one of a plurality of topics with which the search term has a greatest associative measure.

3. The computing system of claim 1, wherein clustering search terms comprises assigning each search term to at least one of a plurality of topics.

4. The computing system of claim 1, wherein clustering search terms comprises determining an associative measure between each search term and each of a plurality of topics in accordance with latent Dirichlet allocation.

5. The computing system of claim 1, wherein the pointwise mutual information score is a specified fraction of a greatest pointwise mutual information score.

6. The computing system of claim 1, wherein the weight of each individual count exponentially decays with the age of a respective individual count.

7. A computer-implemented method, comprising:
    under control of one or more computer systems configured with executable instructions, analyzing keywords of previous searches to detect fixed phrases suitable for inclusion in a search index, each fixed phrase including a first keyword and a second keyword;

determining a first count of the first keyword, a second count of the second keyword, and a mutual count of the first keyword and the second keyword appearing simultaneously in the previous searches;

weighting each individual count of the first count, the second count, and the mutual count based at least in part on age of a respective individual count with respect to the previous searches;

determining a pointwise mutual information score using the weighted first count of the first keyword, the weighted second count of the second keyword, and the weighted mutual count of the first keyword and the second keyword;

associating a respective suitable fixed phrase with the search index based at least in part on the determined pointwise mutual score being greater than a threshold score;

in response to receiving a search request, determine a relevance score for each of at least a portion of the keywords, including the respective suitable fixed phrase, with respect to a collection of content;

provide at least one search result for presentation, the at least one search result at least referencing content selected from the collection of content based at least in part on the at least one relevance score;

detect interaction with a search result of the provided at least one result from a user; and update the keywords associated with the search result.

8. A computer-implemented method according to claim 7, further comprising:

associating the keywords of the previous searches in accordance with a latent Dirichlet allocation.

9. A computer-implemented method according to claim 7, wherein each fixed phrase comprises a plurality of words.

10. A computer-implemented method according to claim 7, further comprising:

determining at least one relevance score for the at least one suitable fixed phrase with respect to a topic.

11. A computer-implemented method according to claim 10, wherein the at least one relevance score is based at least in part on detected interaction with one or more search results previously presented that correspond to the at least one suitable fixed phrase.

12. A computer-implemented method according to claim 7, wherein the determined threshold is based at least in part on a fraction of a greatest of the pointwise mutual information scores.

13. A computer-implemented method according to claim 7, wherein the weight of each individual count exponentially decays with the age of a respective individual count.

14. A computer-implemented method according to claim 7, wherein the age is a difference between a time when the respective individual count appeared in the previous searches and a current time.

15. A non-transitory computer-readable storage medium storing instructions that, when executed by a processor, cause the processor to:

associate keywords of previous searches with a topic;

identify a candidate phrase from the previous searches that contains a first keyword and at least one second keyword associated with the topic;

determine a first count of the first keyword, a second count of the at least one second keyword, and a mutual count of the first keyword and the second keyword appearing simultaneously in the previous searches;

weight each individual count of the first count, the second count, and the mutual count based at least in part on age of a respective individual count with respect to the previous searches, wherein each age is a difference between a time when the respective individual count appeared in the previous searches and a current time;

determine pointwise mutual information score for the candidate phrase using the weighted first count of the first keyword, the weighted second count of the second keyword, and the weighted mutual count of the first keyword and the second keyword;

based at least in part on the determined pointwise mutual score being greater than a threshold pointwise mutual score, select the candidate phrase as a fixed phrase;

determine a relevance score for the fixed phrase with respect to the topic;

based at least in part on the relevance score being above a threshold score for the topic, associate the fixed phrase with the topic;

in response to receiving a search query, provide at least one search result for presentation, the at least one search result at least referencing content selected from a search index based at least in part on relevance scores of a plurality of keywords and a plurality of fixed phrases for the topic;

detect interaction with a search result of the provided at least one search result from a user; and update the keywords associated with the search result.

16. The non-transitory computer-readable storage medium of claim 15, wherein an association of keywords of previous searches with the topic is conducted in accordance with a latent Dirichlet allocation.

17. The non-transitory computer-readable storage medium of claim 15, wherein the relevance scores are based at least in part on detected interaction with one or more search results previously presented that correspond to the at least one fixed phrase.

18. The non-transitory computer-readable storage medium of claim 15, wherein counts of candidate phrases are weighted with respect to age.

19. The non-transitory computer-readable storage medium of claim 15, wherein the weight of each individual count exponentially decays with the age of a respective individual count.

* * * * *